(12) United States Patent
Shen et al.

(10) Patent No.: US 10,897,205 B2
(45) Date of Patent: Jan. 19, 2021

(54) POWER CONTROLLERS AND POWER CONVERTERS WITH CONFIGURABLE FEEDBACK LOOP FOR DIFFERENT NOMINAL OUTPUT VOLTAGES

(71) Applicant: Weltrend Semiconductor Inc., Hsinchu (TW)

(72) Inventors: Yi Lun Shen, Hsinchu (TW); Ren Yi Chen, Hsinchu (TW)

(73) Assignee: WELTREND SEMICONDUCTOR INC., Hsinchu (TW)

( * ) Notice: Subject to any disclaimer, the term of this patent is extended or adjusted under 35 U.S.C. 154(b) by 303 days.

(21) Appl. No.: 16/026,299

(22) Filed: Jul. 3, 2018

(65) Prior Publication Data
US 2019/0036458 A1  Jan. 31, 2019

(30) Foreign Application Priority Data
Jul. 25, 2017  (TW) .............................. 106124926 A

(51) Int. Cl.
*H02M 3/335* (2006.01)
*H02M 1/08* (2006.01)

(52) U.S. Cl.
CPC ......... *H02M 3/33523* (2013.01); *H02M 1/08* (2013.01); *H02M 3/33507* (2013.01)

(58) Field of Classification Search
CPC combination set(s) only.
See application file for complete search history.

(56) References Cited

U.S. PATENT DOCUMENTS

| | | | |
|---|---|---|---|
| 2012/0176820 A1* | 7/2012 | Li | H02M 3/33507 363/21.12 |
| 2012/0320632 A1* | 12/2012 | Kalodka | H02M 3/33507 363/16 |
| 2013/0016530 A1* | 1/2013 | Lipcsei | H02M 1/40 363/16 |
| 2014/0036558 A1* | 2/2014 | Tsou | H02M 3/02 363/74 |
| 2016/0105116 A1* | 4/2016 | Chang | H02M 3/33523 363/21.13 |

* cited by examiner

*Primary Examiner* — Alex Torres-Rivera
(74) *Attorney, Agent, or Firm* — McClure, Qualey & Rodack, LLP

(57) ABSTRACT

A power controller is in use of a power converter whose output voltage can be regulated at a first nominal output voltage or a second nominal output voltage less than the first nominal output voltage. An ON-time controller controls an ON time of a driving signal provided to a power switch according to a compensation signal. A frequency controller controls, based on the compensation signal and a feedback signal, a switching frequency of the driving signal. If the compensation signal has an input waveform and when the output voltage is regulated at the first or second nominal output voltage, the frequency controller provides first or second settling time to stabilize the switching frequency, respectively. The second settling time is longer than the first settling time.

7 Claims, 5 Drawing Sheets

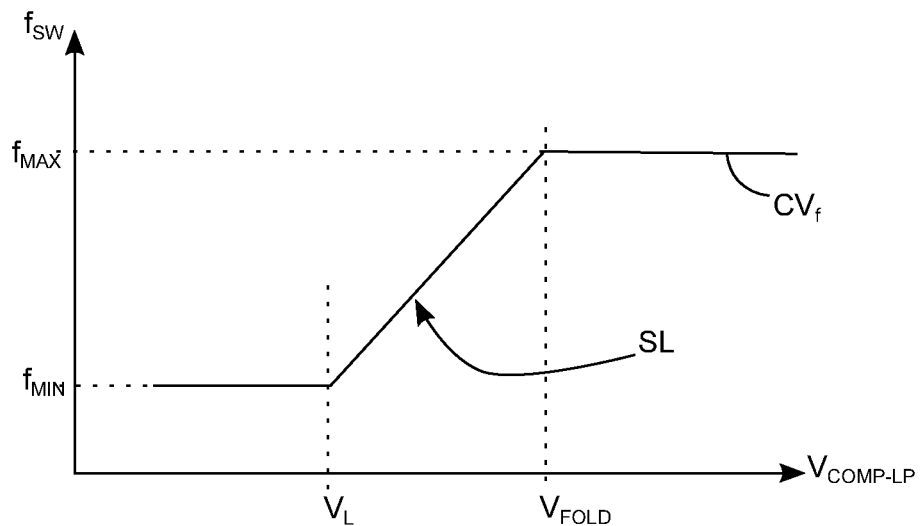
FIG. 4
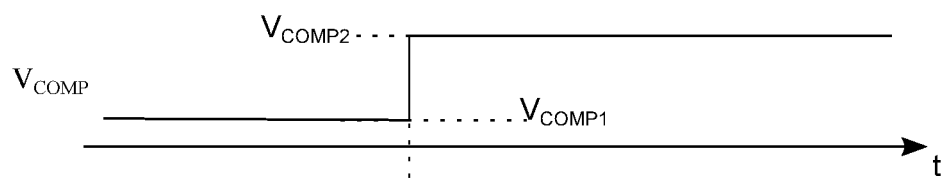
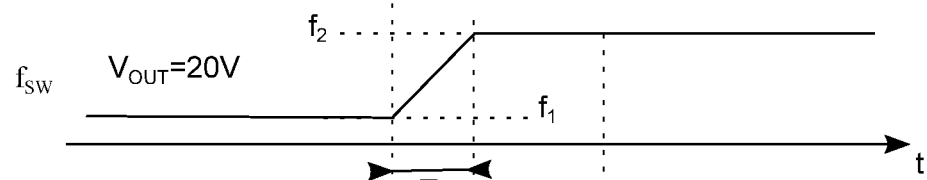
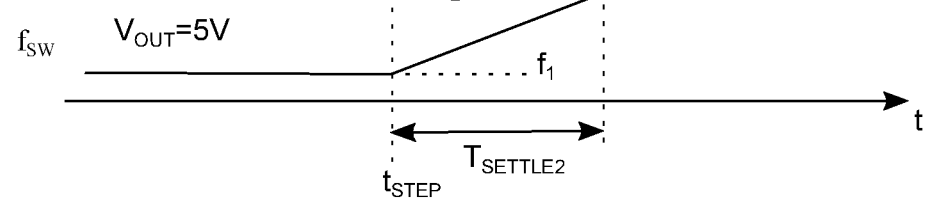

POWER CONTROLLERS AND POWER CONVERTERS WITH CONFIGURABLE FEEDBACK LOOP FOR DIFFERENT NOMINAL OUTPUT VOLTAGES

CROSS-REFERENCE TO RELATED APPLICATION

This application claims priority to and the benefit of Taiwan Application Series Number 106124926 filed on Jul. 25, 2017, which is incorporated by reference in its entirety.

BACKGROUND

The present disclosure relates generally to switching mode power supplies (SMPSs), more particularly to SMPSs and related control methods capable of providing different control feedback loops for different nominal output voltages.

Universal Serial Bus (USB) is one of the communication interfaces most broadly used in daily life nowadays. Beside its reliable, rapid data transmission, USB also plays as an interface delivering limited power to the peripherals connected to it. Most mobile phones are charged using USB chargers, for example.

To make USB more suitable for powering various electric apparatuses and reducing the number of power cables needed, USB Implementers Forum Inc., a non-profit corporation founded by the group of companies that developed the USB specification, has announced USB Power Delivery (PD) to enable the maximum functionality of USB by providing more flexible power delivery along with data over a single cable. USB PD offers increased power levels from existing standards up to 100 W, so it is possible to enable new higher power use cases such as USB powered hard disk drivers and printers.

USB PD requires a USB charger having its output voltage variable in a range from 5V to 20V, and this range could be expanded as broad as being from 3V to 20V in the future. So far, the nominal output voltages of a USB charger complying USB PD are 5V, 12V and 20V, meaning the USB charger should regulate its output voltage at 5V, 12V or 20V. A USB charger complying with USB PD for example might regulate its output voltage at 20V, and switch to regulate its output voltage at 5V upon a demand received from a connected, charged apparatus.

The feedback loop for regulating an output voltage at 5V may be inappropriate for the feedback loop regulating the output voltage at 20V, however. To optimize the output regulation of a USB charger, it is expected to have the feedback loop configurable or changeable when the nominal output voltage of the USB charger is switched.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein:

FIG. 4 shows frequency curve $CV_f$;

FIG. 5A shows that compensation signal $V_{COMP}$ jumps up abruptly from $V_{COMP1}$ to $V_{COMP2}$ at moment $t_{STEP}$;

FIGS. 5B and 5C show the step responses of switching frequency $f_{SW}$ when output voltage $V_{OUT}$ is regulated at 20V and 5V respectively;

DETAILED DESCRIPTION

A USB charger is used as an embodiment of the invention, but the invention is not limited to. Embodiments of the invention include other kinds of switching mode power supplies, and the disclosure of this invention is not on purpose to limit the scope of the invention.

Figure 1:
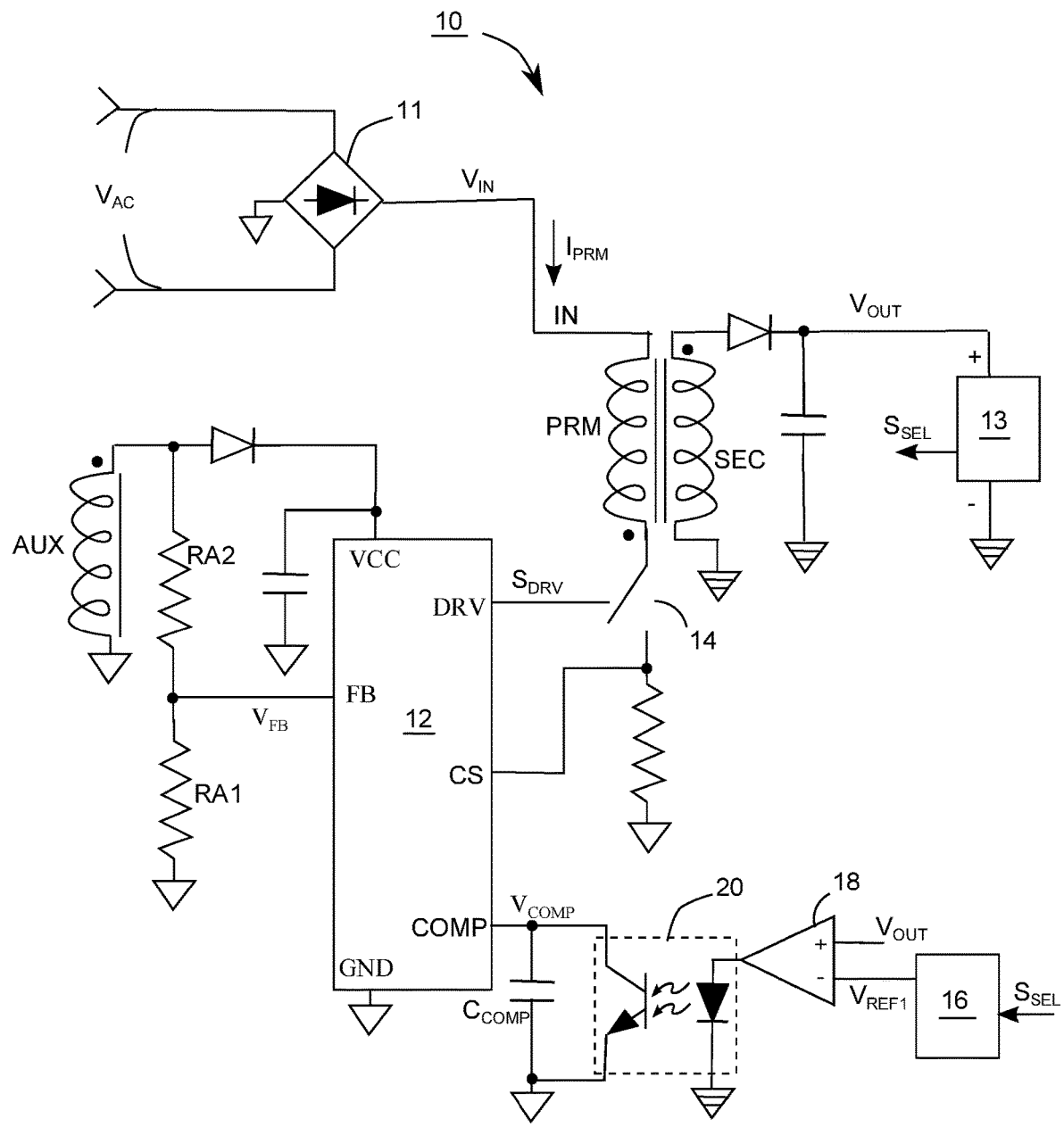
FIG. 1, according to embodiments of the invention, demonstrates a power converter with a flyback topology, capable of being a USB charger to charge a rechargeable apparatus.

FIG. 1, according to embodiments of the invention, demonstrates a power converter 10 with a flyback topology, capable of being a USB charger to charge rechargeable apparatus 13. Bridge rectifier 11 rectifies alternating-current (AC) voltage $V_{AC}$ to provide an input voltage $V_{IN}$ and an input ground voltage, which power converter 10 converts to output voltage $V_{OUT}$ and an output ground voltage. Rechargeable apparatus 13 sends selection signal $S_{SEL}$, based on which power converter 10 regulates output voltage $V_{OUT}$ at one of two or more nominal output voltages. In other words, the nominal output voltage of power converter 10 is configurable, determined by selection signal $S_{SEL}$. In this following specification, two nominal output voltages are, but are not limited to be, 20V and 5V respectively.

Based on selection signal $S_{SEL}$, reference voltage generator 16 provides reference voltage $V_{REF1}$, with which comparator 18 compares output voltage $V_{OUT}$ to produce compensation voltage $V_{COMP}$ at compensation node COMP via photo coupler 20, so as to provide feedback control to power controller 12 and to regulate output voltage $V_{OUT}$ at either 5V or 20V as selection signal $S_{SEL}$ selects.

Power converter 10 has a transformer with primary winding PRM, secondary winding SEC and auxiliary winding AUX, inductively coupled to each other. Power controller 12 generates driving signal $S_{DRV}$, based on compensation signal $V_{COMP}$ at compensation node COMP, to turn ON or OFF power switch 14, which accordingly conducts or stops inductor current IPM flowing through primary winding PRM. Power controller 12 has feedback node FB connected via resistors RA1 and RA2 to auxiliary winding AUX. Feedback signal VF at feedback node FB, under some circumstances, represents the voltage drop across auxiliary winding AUX.

According to an embodiment of the invention, power controller 12 controls switching frequency $f_{SW}$ of driving signal $S_{DRV}$ based on compensation signal $V_{COMP}$ and feedback signal $V_{FB}$. The relationship between compensation signal $V_{COMP}$ and switching frequency $f_{SW}$ can be represented by a frequency curve demonstrated in a $V_{COMP}$-to-$f_{SW}$ chart. When compensation signal $V_{COMP}$ becomes less than a predetermined fold voltage $V_{FOLD}$, the frequency curve in the $V_{COMP}$-to-$f_{SW}$ chart indicates that switching frequency $f_{SW}$ reduces according to a frequency-reduction slope SL. Power controller 12 at the same time detects output voltage $V_{OUT}$ of power converter 10 from feedback signal $V_{FB}$ to determine whether the present nominal output voltage is 20V or 5V. If output voltage $V_{OUT}$ is determined to be about 20V, power controller 12 determines switching frequency $f_{SW}$ directly based on compensation signal $V_{COMP}$ and the frequency curve. If output voltage $V_{OUT}$ is determined to be about 5V however, compensation signal $V_{COMP}$ is additionally low-pass filtered before being forwarded to determine switching frequency $f_{SW}$. For a steady state, the frequency curve is the same regardless of whether the nominal output voltage is 5V or 20V. Nevertheless, if compensation signal $V_{COMP}$ varies to have an input waveform, a step input for example, the settling time for switching frequency $f_{SW}$ being stabilized when nominal output voltage is 5V will be longer than that when nominal output voltage is 20V.

According to another embodiment of the invention, power controller 12 controls switching frequency $f_{SW}$ of driving signal $S_{DRV}$ based on compensation signal $V_{COMP}$ and feedback signal $V_{FB}$. The relationship between compensation signal $V_{COMP}$ and switching frequency $f_{SW}$ can be represented by a frequency curve demonstrated in a $V_{COMP}$-to-$f_{SW}$ chart. When compensation signal $V_{COMP}$ becomes less than a predetermined fold voltage $V_{FOLD}$, the frequency curve in the $V_{COMP}$-to-$f_{SW}$ chart indicates that switching frequency $f_{SW}$ reduces according to a frequency-reduction slope SL. Power controller 12 at the same time detects output voltage $V_{OUT}$ of power converter 10 from feedback signal $V_{FB}$ to determine whether the present nominal output voltage is 20V or 5V. If output voltage $V_{OUT}$ is determined to be about 20V, meaning the nominal output voltage is 20V, frequency-reduction slope SL has a first drop-off rate; and if output voltage $V_{OUT}$ is determined to be about 5V, frequency-reduction slope SL has a second drop-off rate less than the first drop-off rate. In one embodiment of the invention, the predetermined fold voltage $V_{FOLD}$ is a constant, unchanged even if output voltage $V_{OUT}$ varies due to the change of the nominal output voltage.

Figure 2:
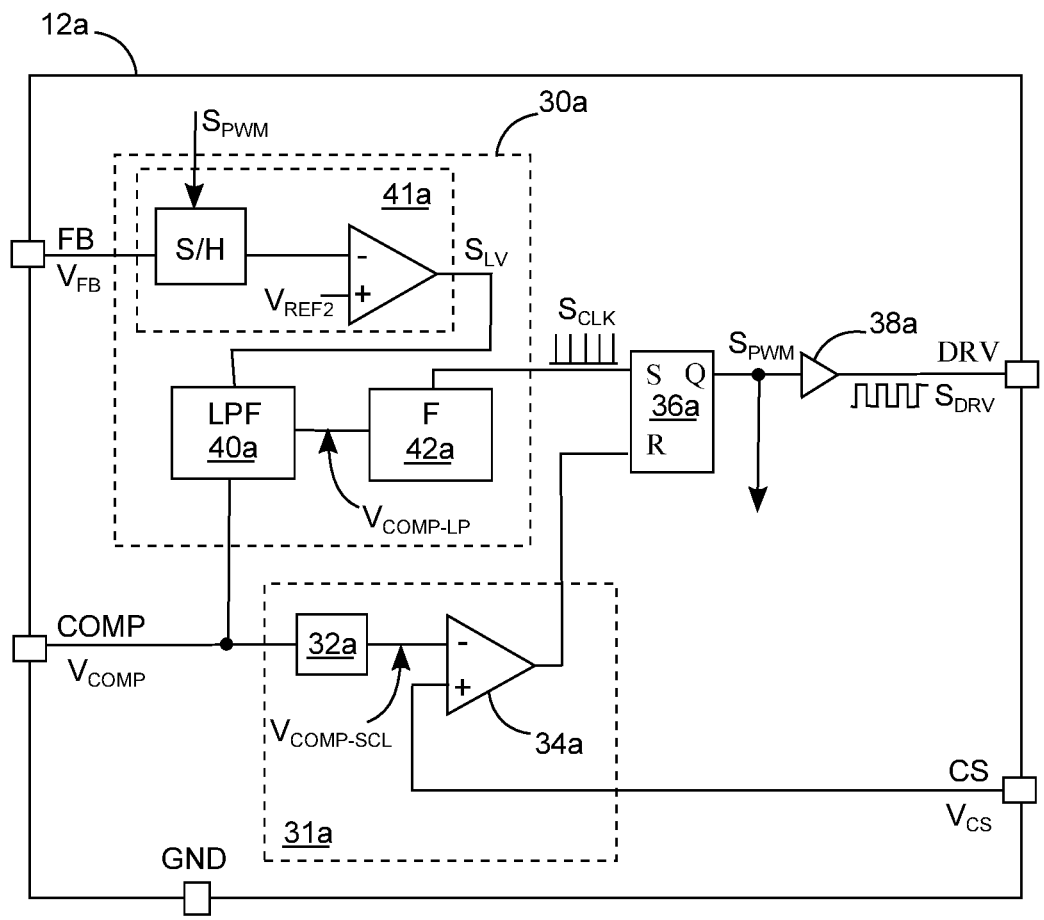
FIG. 2 demonstrates a power controller capable of replacing the power controller in FIG. 1 according to embodiments of the invention.
Figure 3A:
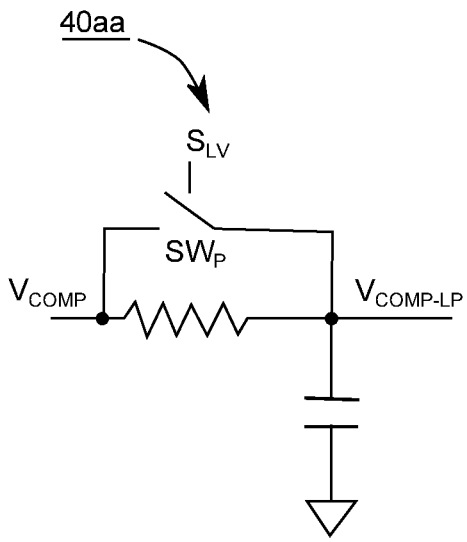
FIGS. 3A, 3B, 3C and 3D demonstrates four low-pass filters.
Figure 3B:
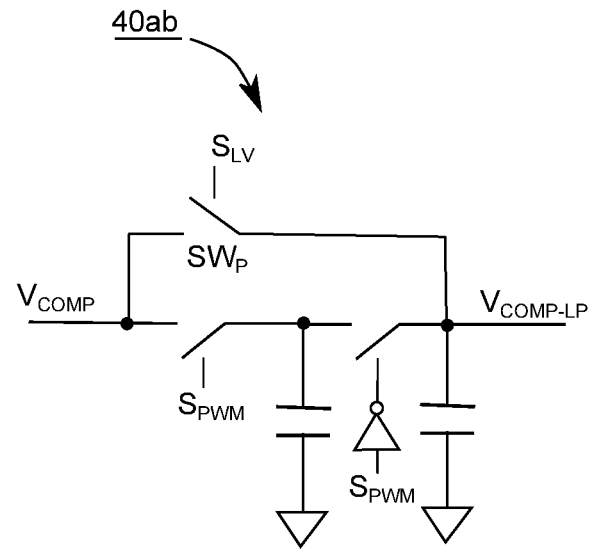
Figure 3C:
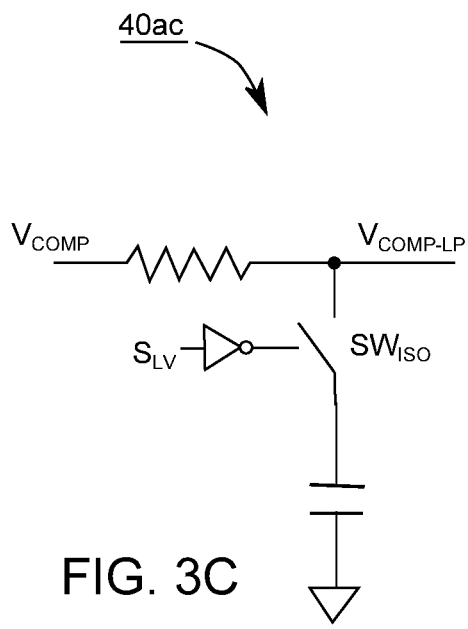
Figure 3D:
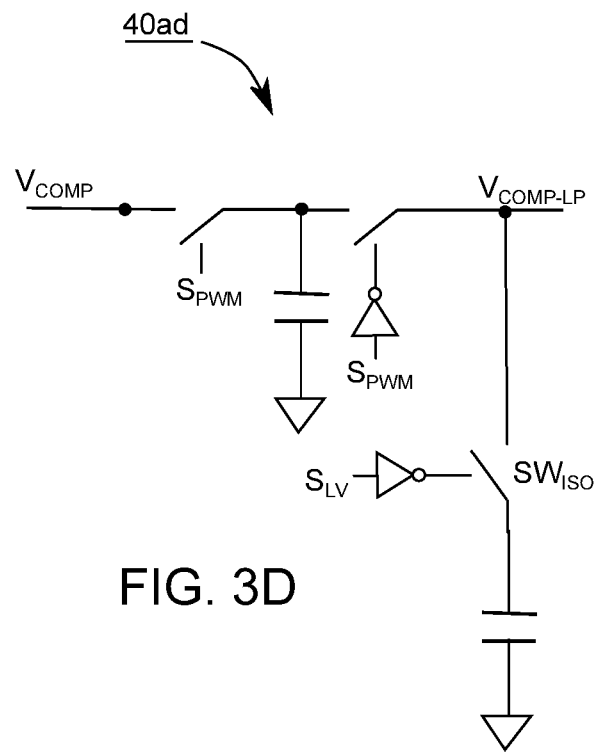

FIG. 2 demonstrates a power controller 12a capable of replacing power controller 12 in FIG. 1 according to embodiments of the invention.

Power controller 12a includes a switch driver 38a, an ON-time controller 31a, a frequency controller 30a and a SR flip-flop 36a.

Switch driver 38a amplifies PWM signal $S_{PWM}$ to become driving signal $S_{DRV}$ with suitable voltage and current that drives power switch 14 in FIG. 1. PWM signal $S_{PWM}$ substantially equals to driving signal $S_{DRV}$ in view of their logic values, and they might be different in logic voltage levels.

ON-time controller 31a controls an ON time of driving signal $S_{DRV}$ according to compensation signal $V_{COMP}$, and has an attenuator 32a and a comparator 34a. Attenuator 32a generates output $V_{COMP-SCL}$ by attenuating compensation signal $V_{COMP}$. For example, attenuator 32a might include a voltage-divider to attenuate compensation signal $V_{COMP}$. When current-sense signal $V_{CS}$ at current-sense node CS exceeds output $V_{COMP-SCL}$, comparator 34a resets SR flip-flop 36a, making PWM signal $S_{PWM}$ having a logic value of "0" and ending ON time $T_{ON}$ of power switch 14.

Frequency controller 30a, based upon compensation signal $V_{COMP}$ and feedback signal $V_{FB}$, provides clock signal $S_{CLK}$ to periodically set SR flip-flop 36a, making PWM signal $S_{PWM}$ have a logic value of "1" and starting ON time $T_{ON}$ of power switch 14. Frequency controller 30a includes an output voltage detector 41a, a low-pass filter 40a and a frequency generator 42a.

Output voltage detector 41a, based on the timing provided by PWM signal $S_{PWM}$, samples feedback signal $V_{FB}$ and compares the sample result with reference voltage $V_{REF2}$, so as to roughly know whether output voltage $V_{OUT}$ is 20V or 5V. For example, if output voltage $V_{OUT}$ is about 20V, the sample result is configured to be higher than reference voltage $V_{REF2}$, so signal $S_{LV}$ from output voltage detector 41a has logic value of "0", and the present nominal voltage is expected to be 20V. If output voltage $V_{OUT}$ is about 5V, the sample result is configured to be less than reference voltage $V_{REF2}$, so signal $S_{LV}$ has logic value of "1", and the present nominal voltage is expected to be 5V.

The filtering function of low-pass filter 40a is configurable, based on the logic value of signal $S_{LV}$. Output voltage detector 41a can dis-enable or enable the filtering function of low-pass filter 40a. For example, if signal $S_{LV}$ is "1" in logic, low-pass filter 40a low-pass filters compensation signal $V_{COMP}$ to provide delayed signal $V_{COMP-LP}$. In the opposite, if the signal $S_{LV}$ is "0" in logic, low-pass filter 40a stops low-pass filtering, and passes compensation signal $V_{COMP}$ substantially without delay, such that delayed signal $V_{COMP}$-LP is about equal to compensation signal $V_{COMP}$. FIGS. 3A, 3B, 3C and 3D demonstrates low-pass filters 40aa, 40ab, 40ac and 40ad, each of which could embody the low-pass filter 40a according to the invention. Each of low-pass filters 40aa and 40ac performs low-pass filtering by using a resistor-capacitor circuit, and each of low-pass filters 40ab and 40ad does by using a switched capacitor circuit. In each of low-pass filters 40aa and 40ab, signal $S_{LV}$ controls a bypass switch $SW_P$, which, when being turned ON, directly makes compensation signal $V_{COMP}$ delayed signal $V_{COMP-LP}$, and disables the function of low-pass filtering. Analogously, in each of low-pass filters 40ac and 40ad, signal $S_{LV}$ controls an isolation switch $SW_{ISO}$, which, when being turned OFF, separates a filtering capacitor from the signal path in the respective low-pass filter, so as to disables the function of low-pass filtering.

Low-pass filter 40a according to embodiments of the invention is not limited to have no function of low-pass filtering when the signal $S_{LV}$ is "0". For example, when the signal $S_{LV}$ is "0" low-pass filter 40a could be a low-pass filter weaker than low-pass filter 40a could be when the signal $S_{LV}$ is "1". Preferably, the direct current response of low-pass filter 40a does not change if signal $S_{LV}$ toggles its logic value, but a high-frequency response of low-pass filter 40a weakens when signal $S_{LV}$ switches from logic "0" to logic 1.

Frequency generator 42a in FIG. 2 provides clock signal $S_{CLK}$ according to delayed signal $V_{COMP-LP}$. Clock signal $S_{CLK}$ substantially determines the moment when power switch 14 is turned ON, so as to decide switching frequency $f_{SW}$ of PWM signal $S_{PWM}$ and driving signal $S_{DRV}$. FIG. 4 shows frequency curve $CV_f$, which demonstrates the relationship between delayed signal $V_{COMP-LP}$ and switching frequency $f_{SW}$ that frequency generator 42a provides. As shown in FIG. 4, frequency generator 42a makes switching frequency $f_{SW}$ about a constant maximum frequency $f_{MAX}$ when delayed signal $V_{COMP-LP}$ exceeds fold voltage $V_{FOLD}$. When delayed signal $V_{COMP-LP}$ decreases to be less than fold voltage $V_{FOLD}$, switching frequency $f_{SW}$ reduces according to a frequency-reduction slope SL, the tilted slope of frequency curve $CV_f$ between fold voltage $V_{FOLD}$ and light-load voltage $V_L$ in FIG. 4. If delayed signal $V_{COMP-LP}$ becomes less than light-load voltage $V_L$, switching frequency $f_{SW}$ remains at about a constant minimum frequency $f_{MIN}$.

FIG. 5A shows that compensation signal $V_{COMP}$ jumps up abruptly from $V_{COMP1}$ to $V_{COMP2}$ at moment $t_{STEP}$ and has an input waveform about representing a step input. FIGS. 5B and 5C show the step responses of switching frequency $f_{SW}$ when output voltage $V_{OUT}$ is regulated at 20V and 5V respectively. Shown in FIG. 5B where output voltage $V_{OUT}$ is about 20V, it, in response to the step input of compensation signal $V_{COMP}$ in FIG. 5A, costs settling time $T_{SETTLE1}$ for frequency controller 30a to stabilize switching frequency $f_{SW}$, which begins from first frequency $f_1$ and finally stabilizes at second frequency $f_2$. Shown in FIG. 5C where output voltage $V_{OUT}$ is about 5V, switching frequency $f_{SW}$, in response to the step input of compensation signal $V_{COMP}$ in FIG. 5A, varies from first frequency $f_1$ and finally stabilizes at second frequency $f_2$. Settling time $T_{SETTLE2}$ in FIG. 5C is longer than settling time $T_{SETTLE1}$ in FIG. 5B, nevertheless. As detailed before, low-pass filter 40a in FIG. 2 is enabled when output voltage $V_{OUT}$ is about 5V, and dis-enabled when output voltage $V_{OUT}$ is 20V. Therefore, the change in compensation signal $V_{COMP}$ needs longer signal propagation delay to actually affect frequency generator 42a when output voltage $V_{OUT}$ is about 5V than it does when output voltage $V_{OUT}$ is about 20V. Therefore, settling time $T_{SETTLE2}$ is longer than settling time $T_{SETTLE1}$ as shown in FIGS. 5A, 5B and 5C.

FIGS. 5A, 5B and 5C also show that in response to the step input of compensation signal $V_{COMP}$ in FIG. 5A, switching frequency $f_{SW}$ stabilizes finally at second frequency $f_2$ no matter whether output voltage $V_{OUT}$ is regulated at 5V or 20V.

The input waveform of compensation signal $V_{COMP}$ is not limited to be a step input, however. For example, compensation signal $V_{COMP}$ might have an input waveform representing a unit pulse. In response to that unit pulse, switching frequency $f_{SW}$ drifts away from an original frequency and, after a settling time, comes back to and settles at the original frequency. The settling time needed when nominal output voltage is 5V is longer than that needed when nominal output voltage is 20V, because longer signal propagation delay is needed when nominal output voltage is 5V.

The low-pass filtering provided when output voltage $V_{OUT}$ is about 5V slows the response of switching frequency $f_{SW}$ to the change in compensation signal $V_{COMP}$, and therefore possibly stabilizes the feedback control more.

Figure 6:
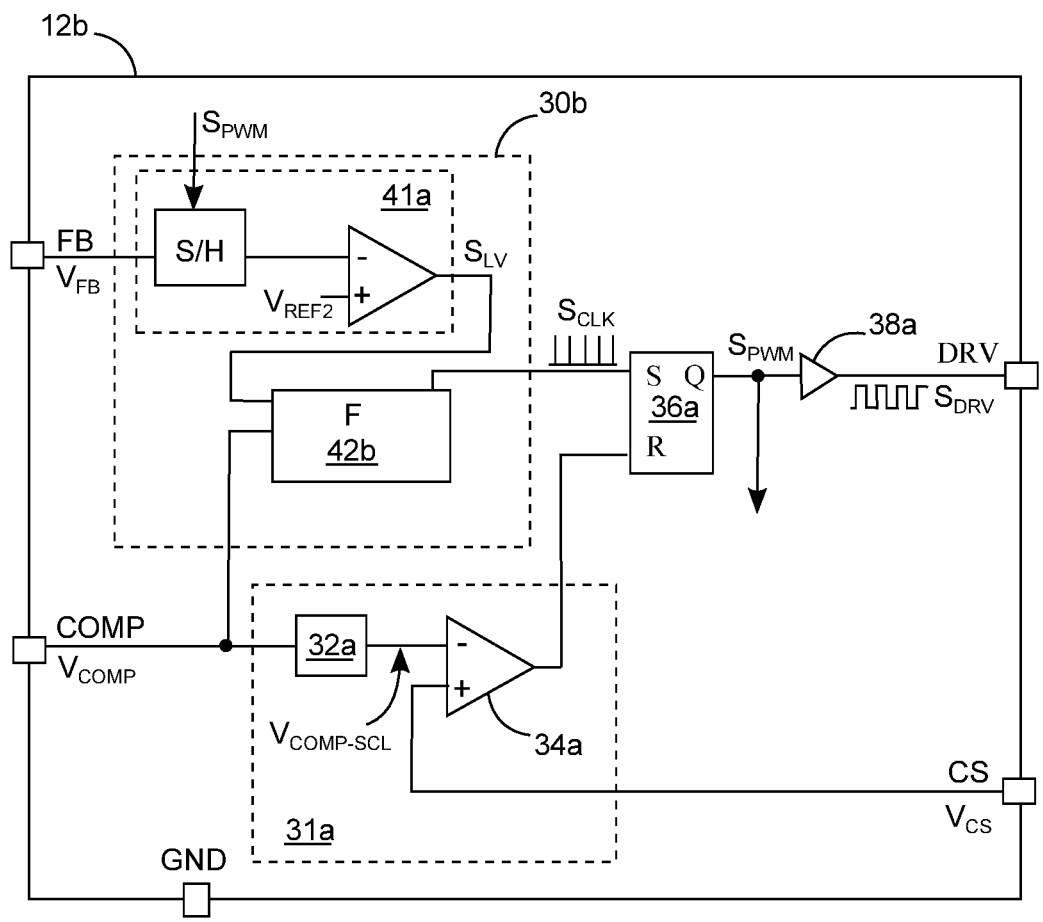
FIG. 6 demonstrates a power controller capable of replacing the power controller in FIG. 1 according to embodiments of the invention.

FIG. 6 demonstrates a power controller 12b capable of replacing power controller 12 in FIG. 1 according to embodiments of the invention. The same or similar components commonly shared by power controllers 12b and 12a can be understood in light of the aforementioned teaching regarding to power controller 12a and will not be detailed redundantly for brevity.

Power controller 12b, unlike power controller 12a, has frequency controller 30b with output voltage detector 41a and frequency generator 42b.

Output voltage detector 41a, based on the timing provided by PWM signal $S_{PWM}$, detects output voltage $V_{OUT}$ via feedback node FB and auxiliary winding AUX, so as to roughly know whether output voltage $V_{OUT}$ is 20V or 5V. For example, if output voltage $V_{OUT}$ is about 20V, signal $S_L$ has logic value of "0", and the present nominal voltage is expected to be 20V. If output voltage $V_{OUT}$ is about 5V, signal $S_{LV}$ has logic value of "1", and the present nominal voltage is expected to be 5V.

Figure 7:
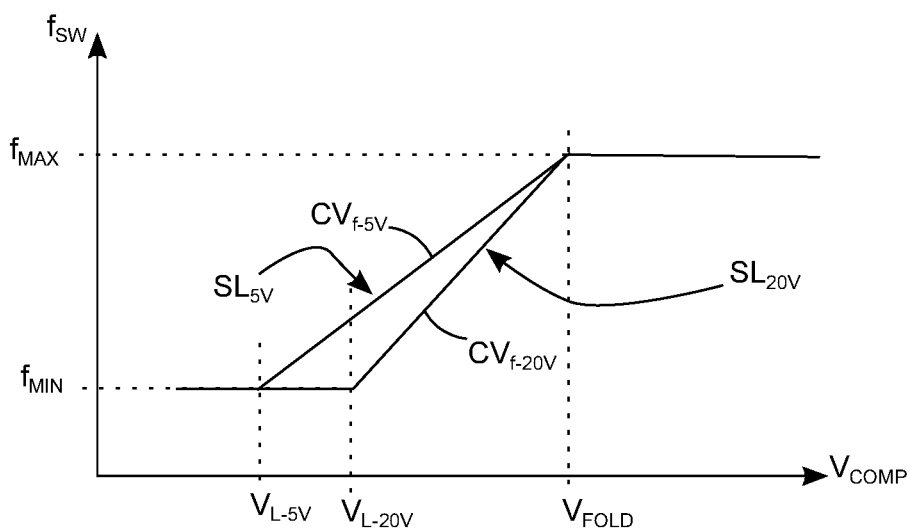
FIG. 7 shows frequency curves $CV_{f-5V}$ and $CV_{f-20V}$.

Frequency generator 42b provides clock signal $S_{CLK}$ according to compensation signal $V_{COMP}$ and signal $S_{LV}$. Clock signal $S_{CLK}$ substantially determines the moment when power switch 14 is turned ON, so as to decide switching frequency $f_{SW}$ of PWM signal $S_{PWM}$ and driving signal $S_{DRV}$. FIG. 7 shows frequency curves $CV_{f-5V}$ and $CV_{f-20V}$, different relationships between compensation signal $V_{COMP}$ and switching frequency $f_{SW}$ that frequency generator 42b provides. Frequency generator 42b employs frequency curve $CV_{f-5V}$ when output voltage $V_{OUT}$ is about 5V, and frequency curve $CV_{f-20V}$ when output voltage $V_{OUT}$ is about 20V. Take frequency curve $CV_{f-20V}$ as an example, frequency generator 42b makes switching frequency $f_{SW}$ about a constant maximum frequency $f_{MAX}$ when compensation signal $V_{COMP}$ exceeds fold voltage $V_{FOLD}$. When compensation signal $V_{COMP}$ decreases to be less than fold voltage $V_{FOLD}$, switching frequency $f_{SW}$ reduces according to a frequency-reduction slope $SL_{20V}$, the tilted slope of frequency curve $CV_{f-20V}$ between fold voltage $V_{FOLD}$ and light-load voltage $V_{L-20V}$ in FIG. 7. If compensation signal $V_{COMP}$ becomes less than light-load voltage $V_{L-20V}$, switching frequency $f_{SW}$ remains at about a constant minimum frequency $f_{MIN}$. Frequency curve $CV_{f-5V}$ in FIG. 7, unlike frequency curve $CV_{f-20V}$, reduces switching frequency $f_{SW}$ according to a frequency-reduction slope $SL_{5V}$, the tilted slope of frequency curve $CV_{f-5V}$ between fold voltage $V_{FOLD}$ and light-load voltage $V_{L-5V}$, while, as shown in FIG. 7, frequency-reduction slope $SL_{5V}$ has a drop-off rate less than frequency-reduction slope $SL_{20V}$ does. Frequency-reduction slopes $SL_{20V}$ and $SL_{5V}$ commonly share fold voltage $V_{FOLD}$, and light-load voltage $V_{L-5V}$ is less than light-load voltage $V_{L-20V}$.

In other words, output voltage detector 41a makes frequency generator 42b respond to compensation signal $V_{COMP}$ to synthesize switching frequency $f_{SW}$ based on frequency-reduction slop $SL_{20V}$ when output voltage $V_{OUT}$ is regulated at about 20V, and based on frequency-reduction slop $SL_{5V}$ when output voltage $V_{OUT}$ is regulated at about 5V, where frequency-reduction slop $SL_{5V}$, in comparison with frequency-reduction slop $SL_{20V}$, has a less drop-off rate.

As frequency-reduction slop $SL_{5V}$ is less tilted than frequency-reduction slop $SL_{20V}$, switching frequency $f_{SW}$ could less respond to the change in compensation signal $V_{COMP}$ when output voltage $V_{OUT}$ is about 5V than it does when output voltage $V_{OUT}$ is about 20V, to form an adjustable control loop fitting different nominal output voltages.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power controller for a power converter converting an input voltage into an output voltage, wherein the power converter is configured to, based on a selection signal, switch the output voltage from a first nominal output voltage to a second nominal output voltage less than the first nominal output voltage, the power converter includes a primary winding, a secondary winding and an auxiliary winding, the power controller comprising:
   a switch driver for providing a driving signal to a power switch to control an inductor current through the primary winding; and an ON-time controller for controlling an ON time of the driving signal according to a compensation signal; and a frequency controller for, based on the compensation signal and a feedback signal, controlling a switching frequency of the driving signal, wherein when the compensation signal becomes lower than a fold voltage the frequency controller reduces the switching frequency according to a frequency-reduction slope, when the output voltage is regulated at the first nominal output voltage the frequency-reduction slope has a first drop-off rate, and when the output voltage is regulated at the second nominal output voltage the frequency-reduction slope has a second drop-off rate less than the first drop-off rate;

wherein the compensation signal is generated by comparing the output voltage with a reference voltage determined by the selection signal; and the feedback signal is at a feedback node coupled to the auxiliary winding.

2. The power controller as claimed in claim 1, wherein when the compensation signal is more than the fold voltage the frequency controller makes the switching frequency about a first predetermined frequency.

3. The power controller as claimed in claim 2, wherein when the compensation signal is less than a light-load voltage less than the fold voltage the frequency controller makes the switching frequency a second predetermined frequency less than the first predetermined frequency regardless of the output voltage.

4. The power controller as claimed in claim 1, wherein the frequency controller comprises:

an output voltage detector coupled to the feedback node, for controlling the frequency-reduction slope based on the feedback signal;

when the output voltage is regulated at the first nominal output voltage the output voltage detector makes the frequency-reduction slope having the first drop-off rate; and when the output voltage is regulated at the second nominal output voltage the output voltage detector makes the frequency-reduction slope having the second drop-off rate.

5. A power converter for converting an input voltage into an output voltage, and, based on a selection signal, being capable of switching the output voltage from a first nominal output voltage to a second nominal output voltage less than the first nominal output voltage, the power converter comprising:

a transformer with a primary winding, a secondary winding and an auxiliary winding, inductively-coupled to one another;

a power switch for controlling an inductor current through the primary winding;

a power controller, for, based on a compensation signal and a feedback signal, providing a driving signal to the power switch, the power controller comprising:

a feedback node, coupled to the auxiliary winding to provide the feedback signal; and a frequency controller for, based on the compensation signal and the feedback signal, controlling a switching frequency of the driving signal, wherein when the compensation signal becomes lower than a fold voltage the frequency controller reduces the switching frequency according to a frequency-reduction slope, when the output voltage is regulated at the first nominal output voltage the frequency-reduction slope has a first drop-off rate, and when the output voltage is regulated at the second nominal output voltage the frequency-reduction slope has a second drop-off rate less than the first drop-off rate;

wherein the compensation signal is generated by comparing the output voltage with a reference voltage determined by the selection signal.

6. The power converter as claimed in claim 5, wherein when the compensation signal is more than the fold voltage the frequency controller makes the switching frequency a first predetermined frequency.

7. The power converter as claimed in claim 6, wherein when the compensation signal is less than a light-load voltage less than the fold voltage the frequency controller makes the switching frequency a second predetermined frequency less than the first predetermined frequency regardless of the output voltage.

* * * * *